(12) United States Patent
Pokutta-Paskaleva et al.

(10) Patent No.: US 9,969,224 B2
(45) Date of Patent: May 15, 2018

(54) PNEUMATIC VEHICLE TIRE

(71) Applicant: Continental Reifen Deutschland GmbH, Hannover (DE)

(72) Inventors: Anastassia Pokutta-Paskaleva, Atlanta, GA (US); Amelia Olga Goncalves Ankiewicz, Hannover (DE); Jens Hoffmann, Meerbusch (DE); Alexander Wuest, Seelze (DE); Klaus Wiese, Hannover (DE); Ulrich Vermehr, Hannover (DE); Yeo Chun Yi, Hannover (DE); Moh Wahi Mohd Wahinuddin, Hannover (DE); Franz-Josef Dopheide, Ankum (DE)

(73) Assignee: Continental Reifen Deutschland GmbH, Hannover (DE)

( * ) Notice: Subject to any disclaimer, the term of this patent is extended or adjusted under 35 U.S.C. 154(b) by 330 days.

(21) Appl. No.: 14/716,732

(22) Filed: May 19, 2015

(65) Prior Publication Data

US 2015/0251500 A1 Sep. 10, 2015

Related U.S. Application Data

(63) Continuation of application No. PCT/EP2013/068044, filed on Sep. 2, 2013.

(30) Foreign Application Priority Data

Nov. 19, 2012 (DE) .......................... 10 2012 111 116

(51) Int. Cl.
*B60C 11/11* (2006.01)
*B60C 11/12* (2006.01)
(Continued)

(52) U.S. Cl.
CPC .......... *B60C 11/1263* (2013.01); *B60C 11/01* (2013.01); *B60C 11/0306* (2013.01);
(Continued)

(58) Field of Classification Search
CPC . B60C 11/11; B60C 11/1218; B60C 11/1263; B60C 11/1369; B60C 2011/0348; B60C 2011/0369
See application file for complete search history.

(56) References Cited

U.S. PATENT DOCUMENTS 8,640,750 B2 2/2014 Kageyama
2008/0066841 A1* 3/2008 Mathews ............ B60C 11/0306
152/209.22
(Continued)

FOREIGN PATENT DOCUMENTS

EP  1 920 951 A1  5/2008
JP  06-143941 A * 5/1994
(Continued)

OTHER PUBLICATIONS

Machine translation for Japan 2005-162197 (no date).*
(Continued)

*Primary Examiner* — Steven D Maki
(74) *Attorney, Agent, or Firm* — Walter Ottesen, P.A.

(57) ABSTRACT

A vehicle tire has outer shoulders and two tread halves. The tire includes a tread having six block rows and a plurality of circumferential grooves. Mutually adjacent ones of the block rows are separated from each other by a corresponding one of the plurality of circumferential grooves. Each of the block rows has individual blocks separated from each other by mutually parallel essentially straight transverse grooves running at an angle to the axial direction of the tire. The circumferential grooves include first circumferential grooves having a maximum profile depth and second cir-
(Continued)

cumferential grooves having a second profile depth less than the maximum profile depth. The transverse grooves have a depth approximately corresponding to a maximum profile depth at first outlet locations. The transverse grooves have a depth corresponding to the second profile depth at second outlet locations.

15 Claims, 3 Drawing Sheets

(51) Int. Cl.
  *B60C 11/13* (2006.01)
  *B60C 11/03* (2006.01)
  *B60C 11/01* (2006.01)

(52) U.S. Cl.
  CPC ....... *B60C 11/0311* (2013.01); *B60C 11/1236* (2013.01); *B60C 11/13* (2013.01); *B60C 11/11* (2013.01); *B60C 11/1218* (2013.01); *B60C 11/1369* (2013.01); *B60C 2011/0337* (2013.01); *B60C 2011/0346* (2013.01); *B60C 2011/0348* (2013.01); *B60C 2011/0369* (2013.01); *B60C 2011/1213* (2013.01); *B60C 2200/06* (2013.01)

(56) References Cited

U.S. PATENT DOCUMENTS

| | | | |
|---|---|---|---|
| 2011/0041972 A1* | 2/2011 | Kageyama | B60C 11/0306 152/209.15 |
| 2013/0087260 A1* | 4/2013 | Tobino | B60C 11/11 152/209.8 |

FOREIGN PATENT DOCUMENTS

| | | | |
|---|---|---|---|
| JP | 11-334318 A | * | 12/1999 |
| JP | 2005-162197 A | * | 6/2005 |

OTHER PUBLICATIONS

Machine translation for Japan 11-334318 (no date).*
Machine translation for Japan 06-143941 (no date).*
International Search Report dated Nov. 13, 2013 of international application PCT/EP2013/068044 on which this application is based.
Translation of the Written Opinion dated May 19, 2015 of international application PCT/EP2013/068044 on which this application is based.

* cited by examiner

PNEUMATIC VEHICLE TIRE

CROSS REFERENCE TO RELATED APPLICATIONS

This application is a continuation application of international patent application PCT/EP2013/068044, filed Sep. 2, 2013, designating the United States and claiming priority from German application 10 2012 111 116.2, filed Nov. 19, 2012, and the entire content of both applications is incorporated herein by reference.

FIELD OF THE INVENTION

The invention relates to a pneumatic vehicle tire for a utility vehicle tire, in particular for use under winter driving conditions, having a tread with at least six block rows which run in encircling fashion in a circumferential direction and which are of substantially corresponding width and which are separated from one another by circumferential grooves which run in encircling fashion in the circumferential direction, wherein the blocks of the individual block rows are separated from one another by at least substantially straight transverse grooves which run parallel to one another in each block row and which run at angles of at most 30° with respect to the axial direction, wherein the blocks are each equipped with a number of sipes extending parallel to the transverse grooves.

BACKGROUND OF THE INVENTION

Utility vehicle tires having, in the tread, a block profile whose blocks are equipped with sipes are known in numerous design variants. Utility vehicle tires of this type are suitable in particular for use under winter driving conditions. For example, a utility vehicle tire, in particular for buses, is known which has a tread made of six block rows running in encircling fashion in a circumferential direction. Each block is equipped with at least one sipe oriented in an axial direction, such that the tire has more than one thousand sipes in the tread, ensuring good traction on snow. On roadways with a relatively thick layer of snow or on steep snow-covered roadways, however, the traction characteristics and handling characteristics of the known vehicle tire are less satisfactory.

SUMMARY OF THE INVENTION

The invention is therefore based on the object of considerably improving the tread of a pneumatic vehicle tire of the type mentioned in the introduction with regard to traction characteristics and handling characteristics on heavily snow-covered roadways and on snow road surfaces in relatively steep terrain.

The stated object is achieved according to the invention in that in each case two block row pairs run in each tread half and are separated from one another by first circumferential grooves which run in an encircling manner in the circumferential direction and which are formed in the maximum profile depth, wherein second circumferential grooves which are of narrower form than the first circumferential grooves run between the block rows of each block row pair and extend to a depth shallower than the maximum profile depth, wherein all of the transverse grooves have a depth which varies over their extent, such that their groove base, viewed in cross section, runs along a curve with a slight S-shaped curvature, wherein the depth of the transverse grooves at their junction points with the first circumferential grooves and at their ends at the outer shoulders of the tire at least substantially corresponds to the maximum profile depth, and wherein the depth of the transverse grooves at the junction regions with the second circumferential grooves corresponds to the depth of the circumferential grooves.

Via the special depth profile of the transverse grooves in the block row pairs and the relatively small depth of the second, narrow circumferential grooves between the block rows of the block row pairs, the block rows are coupled to one another in pairs, whereby the tread is stabilized and the handling characteristics are improved. The multiplicity of transverse grooves and sipes provides the edges required for good traction.

For good grip on snow, it is particularly advantageous if the transverse grooves in the shoulder-side block row pairs are wider than the transverse grooves in the middle block row pairs; in particular, the width of the transverse grooves in the shoulder-side block row pairs should amount to between 150% and 220% of the width of the transverse grooves in the middle block row pairs.

The pneumatic vehicle tire according to the invention has circumferential and lateral stability in the block row pairs which is particularly expedient for good traction on snow if the circumferential grooves between the block rows of the shoulder-side block row pairs have a depth which corresponds to at most 35% of the maximum profile depth, and if the circumferential grooves between the block rows of the middle block row pairs have a depth which corresponds to at most 55% of the maximum profile depth. In this connection, it is also advantageous for the circumferential grooves to have a width from 1.5 mm to 3 mm.

In the shoulder-side block row pairs, higher circumferential stability is advantageous for the handling characteristics. Therefore, according to the invention, the blocks in the block rows of the shoulder-side block row pairs have a circumferential length which corresponds to substantially twice the circumferential length of the blocks in the block rows of the middle block row pairs.

In the middle tread region, it is advantageous for the handling characteristics if the lateral rigidity of the profile blocks arranged here is slightly greater than that of the blocks in the shoulder-side block row pairs. Therefore, according to the invention, the sipes in the blocks of the block rows of the middle block row pairs are so-called 3D sipes, and the sipes in the blocks of the block rows of the shoulder-side block row pairs are so-called 2D sipes. As an additional measure which influences the rigidity, the sipes may have a zigzag-shaped or undulating profile as seen in plan view.

Furthermore, according to the invention, the sipes are configured such that the sipes in the middle block row pairs and in the blocks of those block rows of the shoulder-side block row pairs which run further toward the inside of the tread have a depth profile which at least substantially corresponds to the depth profile of the transverse grooves in the block rows in which the respective sipes run.

BRIEF DESCRIPTION OF THE DRAWINGS

The invention will now be described with reference to the drawings wherein.

DESCRIPTION OF THE PREFERRED EMBODIMENTS OF THE INVENTION

The invention relates to a tread of utility vehicle tires, preferably bus tires, which is particularly suitable for use under winter driving conditions, in particular on snow-covered or icy ground.

Figure 1:
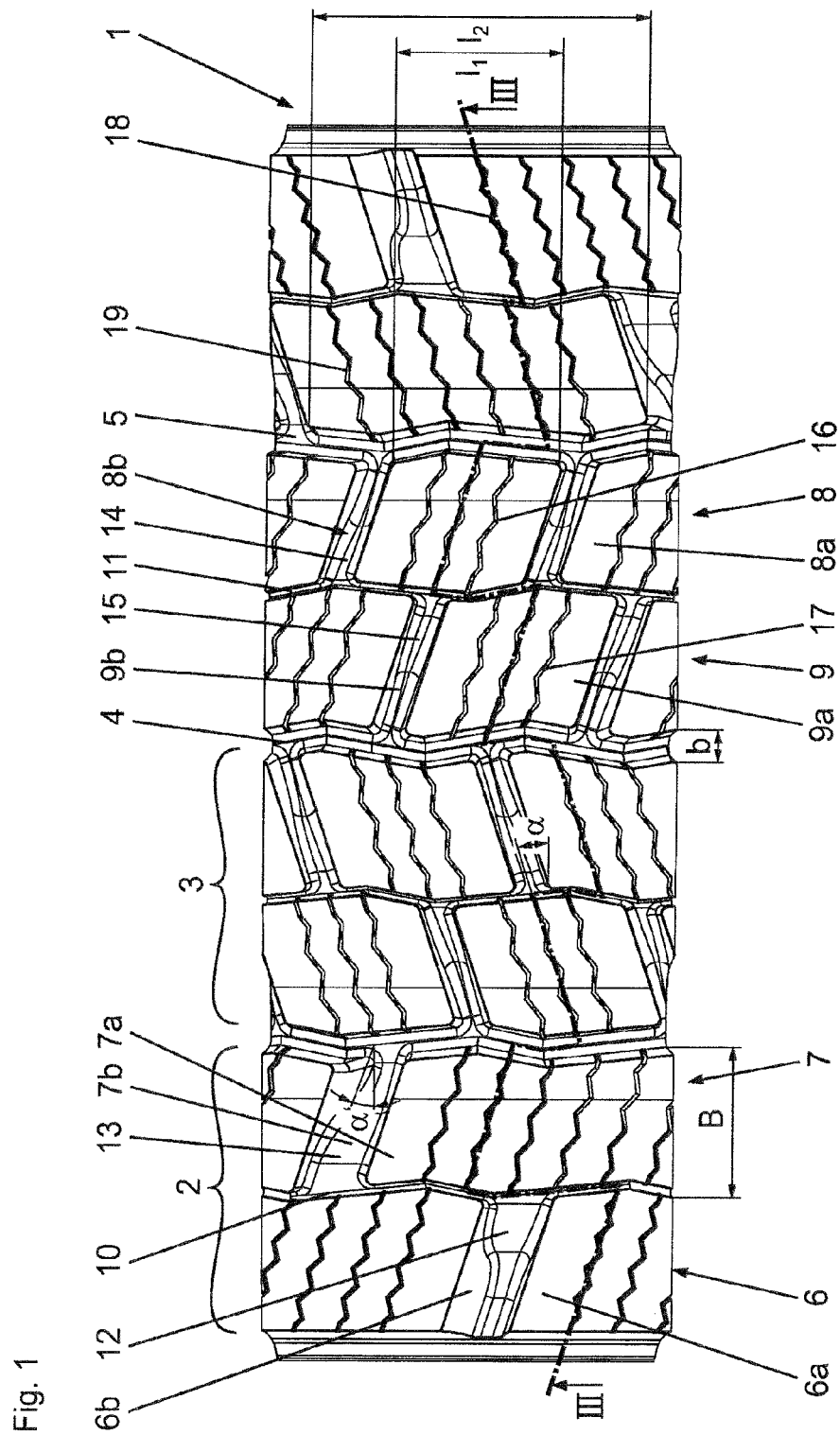
FIG. 1 shows a slightly perspective top plan view of a circumferential section of an embodiment of a tread of a pneumatic vehicle tire.

FIG. 1 shows a plan view of a circumferential section of an embodiment according to the invention of a tread 1, having in each case two block row pairs (2, 3) in each tread half. Along the equatorial plane of the pneumatic vehicle tire, there extends around the tread 1 a central circumferential groove 4 which, in the embodiment shown, has a slightly zigzag-shaped or undulating profile with a small amplitude. The shoulder-side block row pairs 2 are separated from the middle block row pairs 3 by a circumferential groove 5 which likewise runs in zigzag-shaped or undulating fashion with a small zigzag or undulation amplitude. The circumferential grooves 4 and 5 have, at the tread surface, a constant width (b) of 6 mm to 10 mm, have a substantially U-shaped cross section, and extend in a radial direction to the maximum profile depth provided in the respective tread, which in the case of tires configured according to the invention may amount to between 12 mm and 30 mm. All of the circumferential grooves (4, 5) may also run in straight fashion in the circumferential direction. Each shoulder-side block row pair 2 includes two block rows (6, 7) which are separated from one another by a narrow circumferential groove 10 which runs in encircling fashion in the circumferential direction, and each middle block row pair 3 includes two block rows (8, 9) which are likewise separated from one another by a narrow circumferential groove 11 which runs in encircling fashion in the circumferential direction. In the embodiment shown, the circumferential grooves (10, 11) run, analogously to the wide circumferential grooves (4, 5), in a zigzag-shaped or undulating form with an amplitude which may correspond, and in the embodiment shown does correspond, to the amplitude of the zigzag-shaped or undulating form of the circumferential grooves (4, 5). The width of the circumferential grooves (10, 11) at the tread surface is constant over the extent of the grooves (10, 11) and amounts to between 1.5 mm and 2.5 mm, approximately 2 mm in the embodiment shown. The circumferential grooves (10, 11) may also run in straight fashion in the circumferential direction. The circumferential grooves 10 have a constant depth which amounts to between 20% and 35% of the maximum profile depth, in particular approximately 25% of the maximum profile depth. The circumferential grooves 11 have a likewise constant depth which amounts to between 45% and 55% of the maximum profile depth, in particular approximately 50% thereof.

The width B of all of the block rows (6, 7, 8, 9) is substantially equal in the illustrated preferred embodiment of the tread according to the invention, and amounts to between 20 mm and 35 mm depending on tire dimensions. In this case, the width B corresponds in each case to the greatest axial extent of the block rows (6, 7, 8, 9). The axially outer block rows 6 are delimited by shoulder-side shoulder flanks 20 which run substantially in a radial direction and which merge into sidewalls (not shown).

The block rows (8, 9) are made up of blocks 8*a* and 9*a* which are separated from one another in the circumferential direction by transverse grooves 8*b* and 9*b* which run in straight fashion as seen in plan view. At the tread surface, the transverse grooves (8*b*, 9*b*) have a substantially constant width over their extent, which width amounts to between 3 mm and 6 mm. The transverse grooves (8*b*, 9*b*) run parallel to one another and at a small acute angle α, which amounts to between 20° and 30°, with respect to the axial direction. The angle is at least substantially the same in the case of all of the transverse grooves (8*b*, 9*b*), wherein, in the embodiment shown, the transverse grooves (8*b*, 9*b*) in one block row pair 3 which runs in one tread half are inclined oppositely to the transverse grooves (8*b*, 9*b*) which run in the block row pair 3 of the second tread half. The blocks (8*a*, 9*a*) have a circumferential length $l_1$ which amounts to between 110% and 140% of the width B and which varies within a block row (8, 9) owing to the normal pitch length variation of the tread profile.

Figure 2:
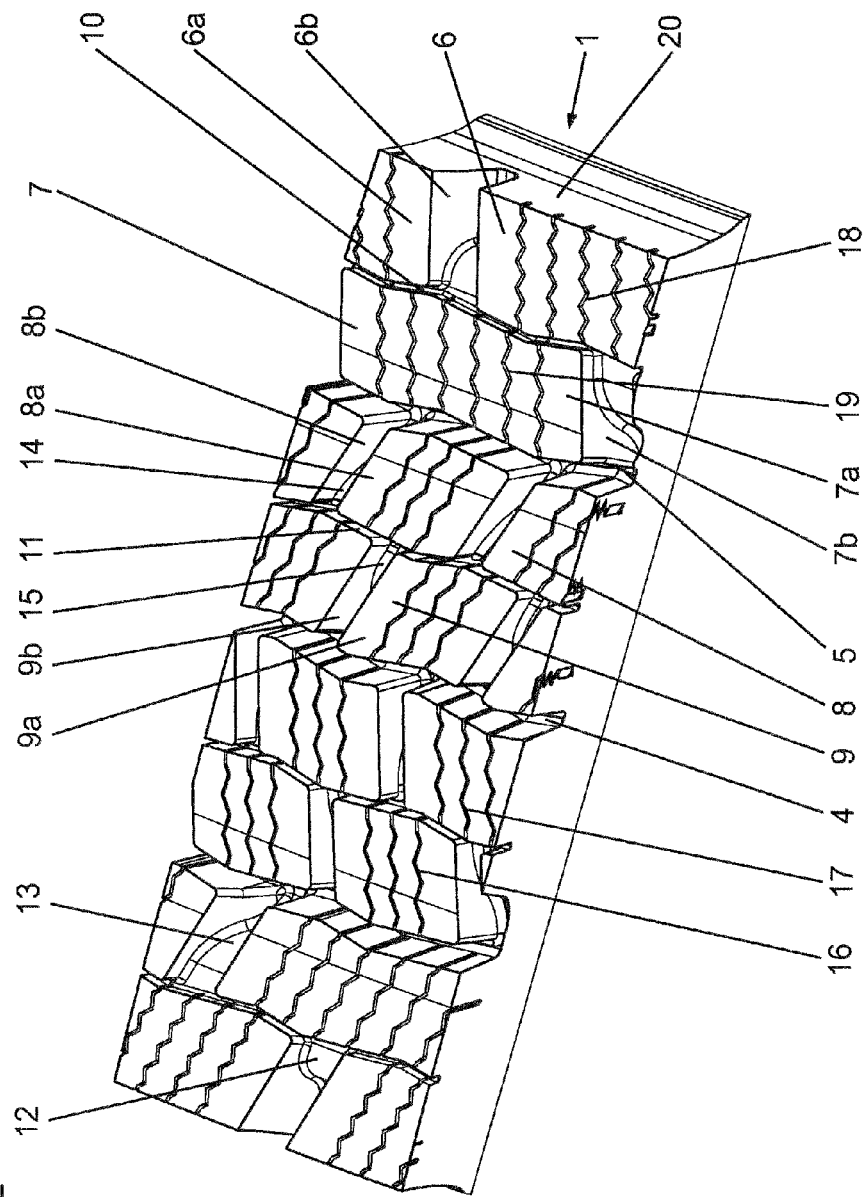
FIG. 2 shows an oblique view of the tread section from FIG. 1.

As shown in particular in FIG. 2, the depth of the transverse grooves 8*b* and 9*b* varies over their extent such that the transverse grooves 8*b* and 9*b*, at the circumferential grooves 4 and 5 respectively, have a depth corresponding to the depth of the circumferential grooves (4, 5). In the direction of the narrow circumferential groove 11 between the two block rows (8, 9), the depth of the transverse grooves (8*b*, 9*b*) becomes progressively smaller, and at the circumferential groove 11, corresponds to the depth of the circumferential groove 11. The change in level of the transverse grooves (8*b*, 9*b*) takes place along a curve with a flattened S-shaped curvature in cross section, such that a base elevation 14 and 15 is formed, adjacent to the circumferential groove 11, in each transverse groove (8*b*, 9*b*). The base elevations (14, 15) have the effect of coupling or connecting the blocks (8*a*, 9*a*) of the two block rows (8, 9) to one another. The block rows (8, 9) and thus also the blocks (8*a*, 9*a*) are offset in the circumferential direction with respect to one another substantially by half block lengths, such that the transverse grooves 9*b* intersect the circumferential groove 11 in the middle region of the blocks 8*a* and the transverse grooves 8*b* intersect the circumferential groove 11 in the middle region of the blocks 9*a*. In each of the blocks 8*a* and 9*a* there is formed a number of sipes 16 and 17, which extend parallel to one another and parallel to the transverse grooves 8*b* and 9*b* and which, in the embodiment shown, have a zigzag-shaped or undulating profile as seen in plan view. At least two sipes 16 and 17, preferably three sipes (16, 17), are provided per profile block (8*a*, 9*a*), wherein the number of sipes (16, 17) may also amount to more than three. The sipes (16, 17) have a width in the range from 0.4 mm to 0.8 mm. In the radial direction, the sipes (16, 17) are formed as so-called 3D (three-dimensional) sipes, as indicated by way of example in FIG. 3. This means that the sipe walls are structured so as to preferably be made up of small surface elements, which for example form elevations in each sipe wall, such that it is possible for the sipe walls to be supported against one another both in the presence of forces acting in a radial direction and in the presence of forces acting in an axial direction and diagonally with respect to these directions. The depth profile of the sipes (16, 17) is matched to the depth profile of the respective transverse grooves (8*b*, 9*b*) in the block rows (8, 9); the sipes (16, 17) therefore have their greatest depth at the wide circumferential grooves (4, 5) and their smallest depth at the junction points with the narrow circumferential groove 11. In this case, the depth of the sipes may correspond at the locations to the local depth of the circumferential grooves 4, 5 and 11, though the sipes may also be of slightly smaller depth.

The blocks (6*a*, 7*a*) in the shoulder-side block rows (6, 7) are separated from one another in the circumferential direction by wide transverse grooves (6b, 7b) which run in substantially straight fashion and parallel to one another and furthermore at an angle α' with respect to the axial direction, which angle may correspond to the angle α and is selected in the range from 10° to 30°. In this case, the transverse grooves (6b, 7b) are in each case inclined oppositely in relation to the axial direction with respect to the transverse grooves (8b, 9b) running in the same tread half. The width of the transverse grooves (6b, 7b) corresponds to at least substantially twice the width of the transverse grooves (8b, 9b), preferably to between 150% and 220% of the width of the transverse grooves (8b, 9b). The circumferential length $l_2$ of the blocks (6a, 7a) corresponds to substantially twice the circumferential length $l_1$ of the blocks (8a, 9a). Thus, for every two blocks (8a, 9a) in the block rows (8, 9), one block (6a, 7a) is provided in the block rows (6, 7). The actual circumferential lengths $l_2$ of the blocks (6a, 7a) are determined by the width selected for the transverse grooves (6b, 7b) and by the respective position of the blocks (6a, 7a) in the selected pitch sequence.

As can be seen in the oblique view in FIG. 2, the groove base of the transverse grooves (6b, 7b) has a depth profile analogous to that of the transverse grooves (8b, 9b). The transverse grooves 6b have their greatest depth at their shoulder-side junction regions with the shoulder flanks 20, and the transverse grooves 7b have their greatest depth at the junction regions with the wide circumferential grooves 5. At the shoulder side, the greatest depth of the transverse grooves 6b corresponds substantially to the maximum profile depth. The depth of the transverse grooves (6b, 7b) becomes progressively smaller in the direction of their profile toward the narrow circumferential groove 10; at the junction regions, the depth of the transverse grooves (6b, 7b) corresponds to the depth of the circumferential groove 10. The change in level in the transverse grooves (6b, 7b) takes place along a curve with a flattened S-shaped curvature in cross section, such that base elevations (12, 13) are formed in the circumferential groove 10. The base elevations (12, 13) have the effect that the two block rows (6, 7) of the block row pairs 2 are connected to one another and are thus, in a desired manner, restricted in terms of their mobility relative to one another.

Figure 3:
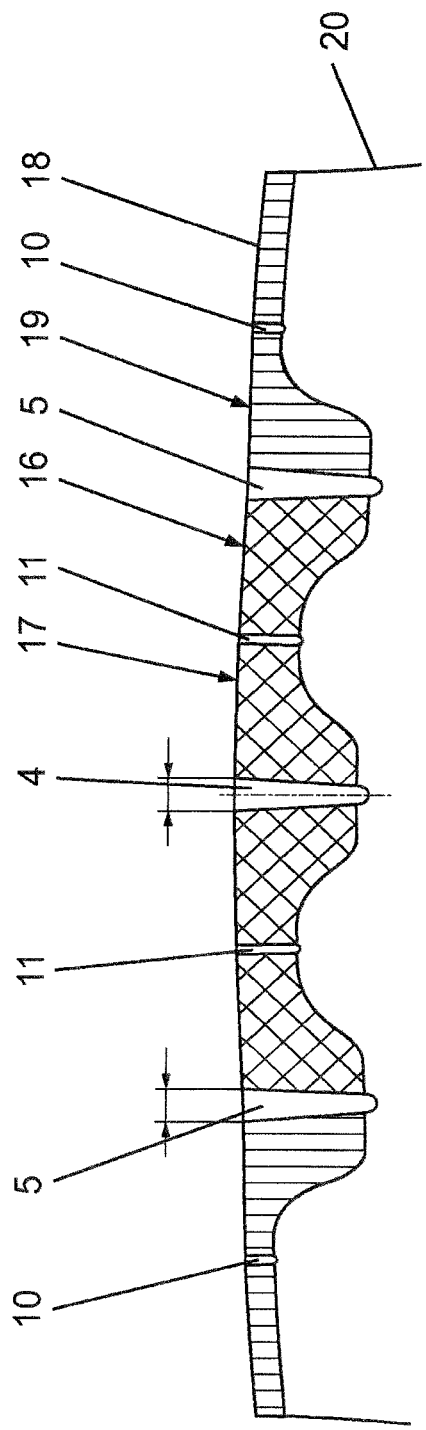
FIG. 3 shows a section along the line III-III in FIG. 1.

A number of sipes (18, 19) also run in each of the blocks (6a, 7a), which sipes each extend parallel to one another and to transverse grooves (6b, 7b), have a zigzag-shaped or undulating profile in plan view, and have a width from 0.4 mm to 0.8 mm. The number of sipes (18, 19) per block (6a, 7a) preferably amounts to twice the number of sipes (16, 17) in the blocks (8a, 9a), in particular to at least six. As viewed in the radial direction, the sipes (18, 19) are so-called 2D (two-dimensional) sipes, that is, the zigzag shape present at the tread surface also continues over the depth of the sipes. This results in particular possibilities with regard to support of the sipe walls against one another; in particular, the sipe walls can be supported against one another in a particularly effective manner in the presence of forces acting in an axial direction and in the presence of lateral forces. The depth profile of the sipes 19 is matched to the depth profile of the transverse grooves 7b. The sipes 19 therefore have their greatest depth at their junction regions with the circumferential grooves 5. As shown in FIG. 3, the sipes 18 have a substantially constant depth, which corresponds substantially to the depth of the circumferential grooves 10.

It is understood that the foregoing description is that of the preferred embodiments of the invention and that various changes and modifications may be made thereto without departing from the spirit and scope of the invention as defined in the appended claims.

LIST OF REFERENCE SIGNS

1 Tread
2 Block row pair, shoulder side
3 Block row pair, middle
4 Circumferential groove, central
5 Circumferential groove
6 Block row, shoulder side
7 Block row, shoulder side
8 Block row, middle
9 Block row, middle
10 Circumferential groove
11 Circumferential groove
12 Base elevation
13 Base elevation
14 Base elevation
15 Base elevation
16 Sipe
17 Sipe
18 Sipe
19 Sipe
20 Shoulder flank
b Width
B Width
6a Block
7a Block
8a Block
9a Block
6b Transverse groove
7b Transverse groove
8b Transverse groove
9b Transverse groove
α Angle
α' Angle
$l_1$ Circumferential length
$l_2$ Circumferential length

What is claimed is:

1. A vehicle tire for a commercial vehicle, the vehicle tire defining outer shoulders, a circumferential direction, an axial direction and two tread halves, the vehicle tire comprising:
   a tire tread having at least six block rows running in an encircling manner in the circumferential direction;
   each of said at least six block rows having a substantially concordant width;
   said tire tread defining a plurality of circumferential grooves running in the circumferential direction;
   mutually adjacent ones of said block rows being separated from each other by a corresponding one of said plurality of circumferential grooves;
   each of said block rows having a plurality of individual blocks;
   said individual blocks of each of said block rows being separated from each other by mutually parallel essentially straight transverse grooves running at an angle of from 10° to 30° to the axial direction;
   each of said blocks having a plurality of sipes extending parallel to the transverse grooves of the same block row;
   said plurality of circumferential grooves including first circumferential grooves having a maximum profile depth and second circumferential grooves;
   said block rows being arranged such that each tread profile half has two pairs of block rows;

said pairs of block rows of each tread profile half being separated from each other by a corresponding one of said first circumferential grooves;

said first circumferential grooves having a first width and said second circumferential grooves having a second width less than said first width;

said block rows of each of said pairs of block rows being separated from each other by a corresponding one of said second circumferential grooves;

said second circumferential grooves having a second profile depth less than said maximum profile depth;

said transverse grooves having respective groove bases and a variable depth over their extent;

said variable depth of said transverse grooves being configured such that, in section, said groove bases run along a curve with a slight s-shaped curvature;

a first portion of said transverse grooves defining first outlet locations to said first circumferential grooves or to the outer shoulders;

said transverse grooves having a depth approximately corresponding to said maximum profile depth at said first outlet locations;

said transverse grooves defining second outlet locations to a corresponding one of said second circumferential grooves;

said transverse grooves having a depth corresponding to said second profile depth at said second outlet locations; and, wherein said plurality of circumferential grooves run in one of a zig-zag or a wave-shaped course when viewed in plan.

2. The vehicle tire of claim 1, wherein:
said pairs of block rows include first block row pairs arranged adjacent corresponding ones of the outer shoulders and second block row pairs arranged centrally in said tire tread between said first block row pairs; and,
said transverse grooves in said first block row pairs have first widths and said transverse grooves in said second block row pairs have second widths; and,
said first widths are greater than said second widths.

3. The vehicle tire of claim 2, wherein said first width is between 150% and 220% of said second width.

4. The vehicle tire of claim 1, wherein:
said pairs of block rows include first block row pairs arranged adjacent corresponding ones of the outer shoulders and second block row pairs arranged centrally in said tire tread between said first block row pairs; and,
said second circumferential grooves arranged between said block rows of said first block row pairs have a depth of at most 35% of said maximum profile depth.

5. The vehicle tire of claim 1, wherein:
said pairs of block rows include first block row pairs arranged adjacent corresponding ones of the outer shoulders and second block row pairs arranged centrally with respect to said tire tread between the first block row pairs; and,
said second circumferential grooves arranged between said block rows of said second block row pairs have a depth of at most 55% of said maximum profile depth.

6. The vehicle tire of claim 1, wherein said second circumferential grooves have a width lying in a range of 1.5 mm to 3 mm.

7. The vehicle tire of claim 1, wherein:
said pairs of block rows include first block row pairs arranged adjacent corresponding ones of the outer shoulders and second block row pairs arranged centrally with respect to said tire tread between said first block row pairs;
said individual blocks of said first block row pairs have peripheral lengths ($l_2$);
said individual blocks of said second block row pairs have peripheral lengths ($l_1$); and,
said peripheral lengths ($l_2$) are approximately twice said peripheral lengths ($l_1$).

8. The vehicle tire of claim 1, wherein
said pairs of block rows include first block row pairs arranged adjacent corresponding ones of the outer shoulders and second block row pairs arranged centrally with respect to said tire tread between said first block row pairs; and,
said sipes of said individual blocks of said second block row pairs are 3D sipes.

9. The vehicle tire of claim 1, wherein:
said pairs of block rows include first block row pairs arranged adjacent corresponding ones of the outer shoulders and second block row pairs arranged centrally with respect to said tire tread between said first block row pairs; and,
said sipes of said individual blocks of said first block row pairs are 2D sipes.

10. The vehicle tire of claim 1, wherein said sipes run in one of a zig-zag and a wave-shaped course when viewed in plan.

11. The vehicle tire of claim 1, wherein:
said pairs of block rows include first block row pairs arranged adjacent corresponding ones of the outer shoulders and second block row pairs arranged centrally with respect to said tire tread between said first block row pairs;
said first block row pairs include first block rows arranged adjacent to the outer shoulder and second block rows arranged inwardly of said first block row;
said transverse grooves of said second block row pairs and said first block row pairs have first depth profiles; and,
said sipes of said second block row pairs and said second block rows of said first block row pairs have second depth profiles approximately corresponding to said first depth profiles.

12. The vehicle tire of claim 1, wherein said transverse grooves run at an angle of from 20° to 30° to the axial direction.

13. The vehicle tire of claim 1, wherein said transverse grooves run at an angle of 30° to the axial direction.

14. The vehicle tire of claim 1, wherein the plurality of sipes extending parallel to the transverse grooves of the same block row have a zigzag shaped or undulating profile.

15. The vehicle tire of claim 1, wherein the transverse grooves in one block row pair which run in one tread half are inclined oppositely to the transverse grooves which run in the block row pair of the second tread half.

* * * * *